(12) United States Patent
Sanda et al.

(10) Patent No.: US 6,625,400 B2
(45) Date of Patent: Sep. 23, 2003

(54) BROWNIE FILM AND CAMERA

(75) Inventors: Akihiro Sanda, Kanagawa (JP); Taro Yamamoto, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/845,163

(22) Filed: May 1, 2001

(65) Prior Publication Data

US 2001/0036365 A1 Nov. 1, 2001

(30) Foreign Application Priority Data

May 1, 2000 (JP) ...................................... 2000-131922

(51) Int. Cl.$^7$ ............................................. G03B 17/24
(52) U.S. Cl. ...................................................... 396/315
(58) Field of Search ................................ 396/310, 315, 396/317, 318, 311; 355/40, 41

(56) References Cited

U.S. PATENT DOCUMENTS

| | | | | |
|---|---|---|---|---|
| 4,123,767 A | * | 10/1978 | Halpern | 396/317 |
| 4,311,377 A | * | 1/1982 | Matteson | 396/390 |
| 5,382,508 A | * | 1/1995 | Ikenoue | 396/315 |
| 5,471,266 A | * | 11/1995 | Satou | 396/318 |
| 5,649,247 A | * | 7/1997 | Itoh et al. | 396/311 |
| 5,740,483 A | * | 4/1998 | Hashimoto et al. | 396/315 |
| 5,933,213 A | * | 8/1999 | Siemer et al. | 355/40 |
| 6,081,674 A | * | 6/2000 | Tatamiya | 396/318 |
| 6,157,785 A | * | 12/2000 | Kawano et al. | 396/315 |
| 6,438,325 B2 | * | 8/2002 | Saito et al. | 396/311 |

FOREIGN PATENT DOCUMENTS

| | | | | |
|---|---|---|---|---|
| JP | 8-22080 | 1/1996 | | G03B/27/32 |
| JP | 10-213884 | 8/1998 | | G03C/3/00 |

OTHER PUBLICATIONS

Patent Abstracts of Japan. JP 08–022080. Jan. 23, 1996.
Patent Abstracts of Japan. JP 10–213884. Aug. 11, 1998.

* cited by examiner

Primary Examiner—Christopher Mahoney
(74) Attorney, Agent, or Firm—Sughrue Mion, PLLC

(57) ABSTRACT

A Brownie film is wound about a spool such that a leader covers outside. A filmstrip has first and second lateral side portions. Upon manufacturing the filmstrip, film information is printed as latent images in the first lateral side portion. The first lateral side portion comes to upper side of the filmstrip when the filmstrip is pulled from the spool to leftward, viewed from a base surface side of the filmstrip. A data exposure head of the camera imprints photographic information as individual printing patterns.

10 Claims, 7 Drawing Sheets

BROWNIE FILM AND CAMERA

BACKGROUND OF THE INVENTION

1. Field of the Invention

The present invention relates to a Brownie film and a camera for loading the Brownie film.

2. Description of the Prior Art

It is well known that "JIS K 7512" and "ISO 732" standardize Brownie films. There are two types of the Brownie films, 120 and 220 types, and each of the types has a filmstrip and a light-shielding paper. For the 120 type, a light-shielding paper, called backing paper, that is longer than a filmstrip is used to cover backside of the filmstrip. In the light-shielding paper, a portion protruding from the leading end of the filmstrip becomes a leader, whereas another portion protruding from the trailing end of the filmstrip becomes a trailer. After inserting the trailer to a slit in a spool, the Brownie film is wound about the spool while the light-shielding paper covers the filmstrip. In the 220 type, leader and trailers are spliced to leading and trailing ends of the filmstrip respectively. The leader and the trailer are made of the light-shielding paper. After the trailer is inserted to the slit in the spool, the Brownie film is wound about the spool.

In both 120 and 220 types, the leader is wound about outermost turn of the rolled film to shield the filmstrip from ambient light. When loaded into a camera, the leader of the Brownie film is inserted into a slit in a spool, hereinafter referred to as a take-up spool, in a film take-up chamber. By film winding operation, the Brownie film is wound about the take-up spool while the leader constitutes innermost turn of the rolled film. The trailer is rolled around to cover outermost turn of a roll of the exposed filmstrip after accomplishing photography. When the exposed Brownie film is taken out from the camera, the trailer protects the filmstrip from ambient light.

The filmstrip has approximately 60 mm width. Standard length of the 120 type filmstrip allows to take twelve picture frames of 6 cm×6 cm, eight picture frames of 6 cm×9 cm, and sixteen picture frames of 6 cm×4.5 cm. Upon manufacture, the filmstrip is recorded printing patterns along two lateral sides in a side printing process. The side printing process is called pre-exposure process. The printing patterns recorded in the side printing process, hereinafter referred to as side printing patterns, comprise film information, product information, characters, and marks. The film information is a type and a photosensitivity of the film. The product information is a manufacturer name, product lot number and serial number. The characters and marks include frame numbers, arrows indicating winding direction, and the like.

In FIG. 7 showing an example of conventional Brownie film, the side printing patterns are recorded as latent images and are visualized through processing of the filmstrip. Inside of upper lateral side portion of the filmstrip 2, there are first and second side printing patterns 3a and 3b alternatively printed. The first side printing pattern 3a is a combination of a manufacturer name "ABC" and a film type "RDP II", whereas the second side printing pattern 3b is a combination of the film type and an emulsion number "123". Moreover, along a lower lateral side portion, side printing patterns 3c, combinations of the film type and a frame number in which an arrow mark and numerals are combined, are printed at a constant pitch. Note that picture frames 4, shown in phantom lines, are in the size of 6 cm×4.5 cm.

Among cameras for the Brownie films, are generally known five types of cameras in which picture frame sizes of 6 cm×6 cm, 6 cm×7 cm, 6 cm×8 cm, and 6 cm×9 cm are producible. Each of these cameras is provided with an exposure aperture in the same size of each picture frame. There are also exposure aperture changeable cameras. To make it possible to use the both 120 and 220 types of the Brownie film, it is well known that each of the cameras is provided with a function to shift a film pressure plate toward the optical axis direction according to thickness of the light-shielding paper.

In the Brownie film, depending on its size, a position of the picture frame deviates from the printed frame number, so the frame number is used as an index representing order of photography. After processing, the filmstrip is cut into picture frames. However, an arranging pitch of the side printing patterns 3c including the frame number is designed to be less than 45 mm in order to have the frame number in the smallest picture frame size of 6 cm×4.5 cm.

Comparing to the 135-size film and IX 240 film, the Brownie film has significantly larger picture frames such that it is possible to take clearer photographs, so it is widely used by commercial and advanced amateur photographers. They usually record photographic conditions such as a focal length of a taking lens, a shutter speed, and an f-stop in each frame. Brownie cameras incorporating a data imprinting device are available in the market so that it allows the photographers to record printing patterns representing these photographic conditions, hereinafter referred to as individual printing patterns, on the film.

In the Brownie camera, the individual printing pattern is optically recorded outside of the picture frame with the data imprinting device to keep space for picture frames as large as possible. In a conventional Brownie film, as shown in FIG. 7, side printing patterns are printed on upper and lower lateral sides of the filmstrip 2. Therefore, there occurs a problem in which the individual printing patterns recorded with the data imprinting device overlaps the side printing patterns, then both printing patterns become illegible. The length of the picture frame along a longitudinal side of the filmstrip is depends on the type of the Brownie camera, so it is impossible to determine arranging pitch of the side printing patterns on the basis of the size of the picture frame.

SUMMARY OF THE INVENTION

In view of the foregoing problem, an object of the present invention is to provide a Brownie film and a camera in which side printing patterns are assuredly prevented from being overlapped by individual printing patterns.

Another object of the present invention is to provide a Brownie film and a camera in which two kinds of printing patterns are readable without error.

To achieve the above and other objects, side printing patterns are recorded only inside of a first lateral side portion that comes to upper side of the filmstrip that is perpendicularly pulled leftward from a spool, viewed from a base side. In a Brownie camera according to the present invention, individual printing patterns are recorded inside of a second lateral side portion by a data exposure head. To keep picture frame of sufficient size, side printing patterns are recorded within an area 2.5 mm, more preferably 2 mm, inside from the first lateral side.

A positional information indicating a position in a longitudinal direction of the filmstrip, for example, a frame number is disposed with its pitch not less than 25 mm and not more than 45 mm. Because the pitch is not more than 45 mm, at least one positional information completely remains in each cut frame, even if the filmstrip is cut into the smallest picture frame size of 6 cm×4.5 cm. Moreover, if it is not less than 25 mm, it is possible to record printing patterns including much information in a sufficient space. It is more preferable to make said arranging pitch not less than 35 mm and not more than 43 mm in view of increase in information amount and keeping sufficient spaces for margins to avoid cutting in the printing patterns.

The side printing patterns and the individual printing patterns are recorded on different lateral side portions, so they do not overlap each other. Moreover, when posture of the filmstrip is determined such that images in picture frames that are visible through processing are shown as erect right images, side and individual printing patterns respectively become erect and right images. It may be possible to record the side printing patterns in the second lateral side portion, and to record the individual printing patterns inside of the first lateral side portion.

According to the present invention, the side printing patterns and the individual printing patterns are respectively recorded in different lateral side portions, so both printing patterns do not overlap. Moreover, the side printing patterns are printed in erect right images in the first lateral side portion that comes to the upper side of the filmstrip pulled leftward from the spool, viewed from the base surface side opposite of the emulsion layers, so as to be in the same posture as photographic images in the picture frames. Therefore, it is easy to observe the photographic images and the side printing patterns. Moreover, the side printing patterns are recorded within a region where is 2.5 mm inside from the lateral side portion, so it is possible to keep sufficient space for the picture frame.

Furthermore, the side printing patterns include the positional information pattern indicating positions in a longitudinal direction of the filmstrip, and its arranging pitch is not less than 25 mm and not more than 45 mm. Even when the filmstrip is cut into frames of the smallest size after processing, each frame has at least one positional information pattern. Thus, it is possible to avoid an inconvenience in which the photographic order becomes indefinite.

BRIEF DESCRIPTION OF THE DRAWINGS

The above objects and advantages of the present invention will become more apparent from the following detailed description when read in connection with the accompanying drawings in which.

DETAILED DESCRIPTION OF THE PREFERRED EMBODIMENTS

Figure 1:
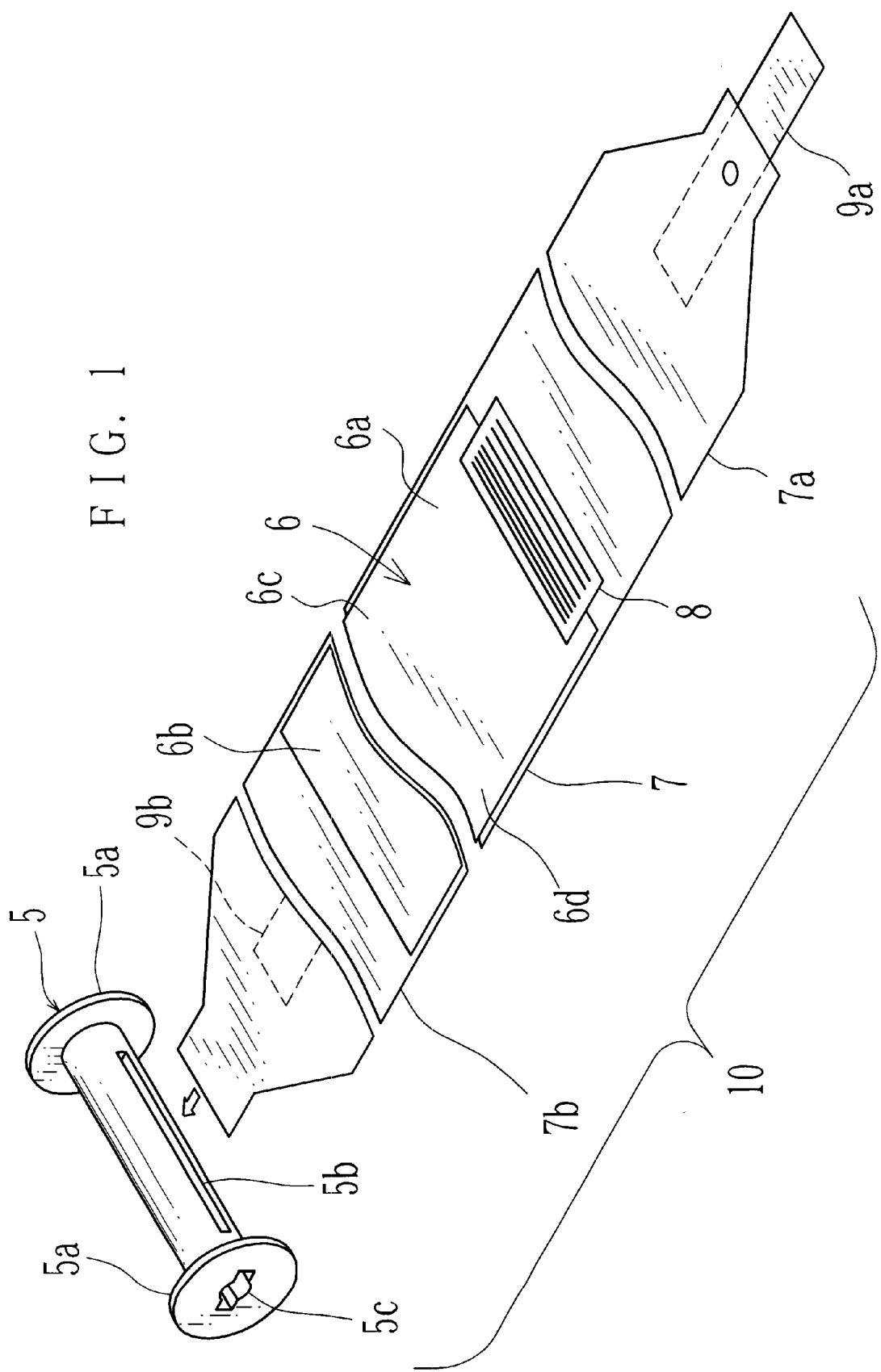
FIG. 1 is an exploded perspective view of a Brownie film according to the present invention.

In FIG. 1, a Brownie film roll 10 of 120 type has a spool 5 being integrally formed from plastic and a Brownie film is wound around the spool 5. The Brownie film comprises an approximately 6 cm wide filmstrip 6 and a light-shielding paper 7.

Figure 3:
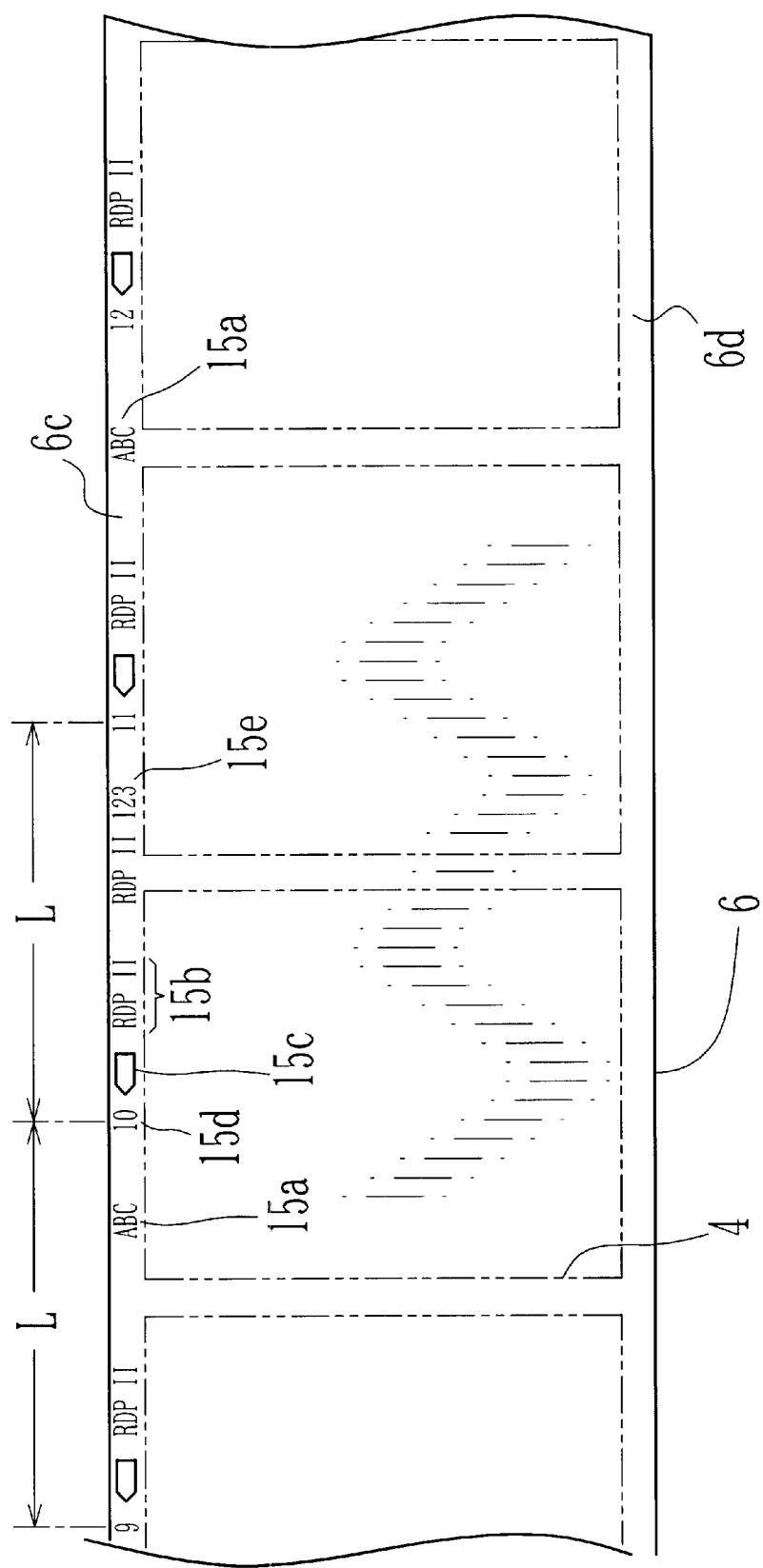
FIG. 3 is a plan view of a filmstrip.

The filmstrip 6 has a film leader 6a and a film trailer 6b. Moreover, a picture frame 4, see FIG. 3, is produced by taking photography. On both sides of the picture frame 4, are positioned a first lateral side portion 6c and a second lateral side portion 6d.

The light-shielding paper 7 is longer than the filmstrip 6. The filmstrip 6 is overlaid on the light-shielding paper 7 such that the base surface side where is not formed emulsion layers is brought in contact with the light-shielding paper 7. Generally, the light-shielding paper 7 of the 120 type Brownie film is called a backing paper.

The spool 5 is constituted of a core and a flange 5a that is integrally formed on respective ends of the core. A part of the core, between the flanges 5a, is formed a slit 5b elongated in a direction of the axis of the spool 5. Moreover, on both ends of the core, are provided keyholes 5c respectively.

The backing paper 7 comprises a leader 7a and a trailer 7b that are protruded from the respective ends of the portion backing the filmstrip 6. The film leader 6a of the filmstrip 6 is fixed to the leader 7a of the backing paper 7 by an adhesive tape 8. However, the film trailer 6b is not fixed to the trailer 7b. When manufacture of the film, an edge portion of the trailer 7b is inserted into the slit 5b, and the Brownie film is wound about the spool 5 while the backing paper 7 overlies the filmstrip 6. The leader 7a is wound about outermost turn of the film roll several turns. The leader 7a is secured by a peelable seal tape 9a so as not to loosen the roll of the Brownie film. In a Brownie camera, the Brownie film is wound about a take-up spool, and then the trailer 7b covers the outermost turn of the filmstrip 6. The trailer 7b shields the Brownie film from ambient light. After the Brownie film is taken out from the camera, the trailer 7b is secured by another peelable seal tape 9b.

On the obverse surface of the adhesive tape 8, a bar code being arranged in a longitudinal direction of the filmstrip 6 is printed. The bar code represents a type of the Brownie film, including 120 or 220 type, negative or reversal, photosensitivity, and length of the filmstrip 6. After the Brownie film is loaded into the camera, at the initial step of film feeding, a bar code reader in the camera reads out the bar code.

Figure 2:
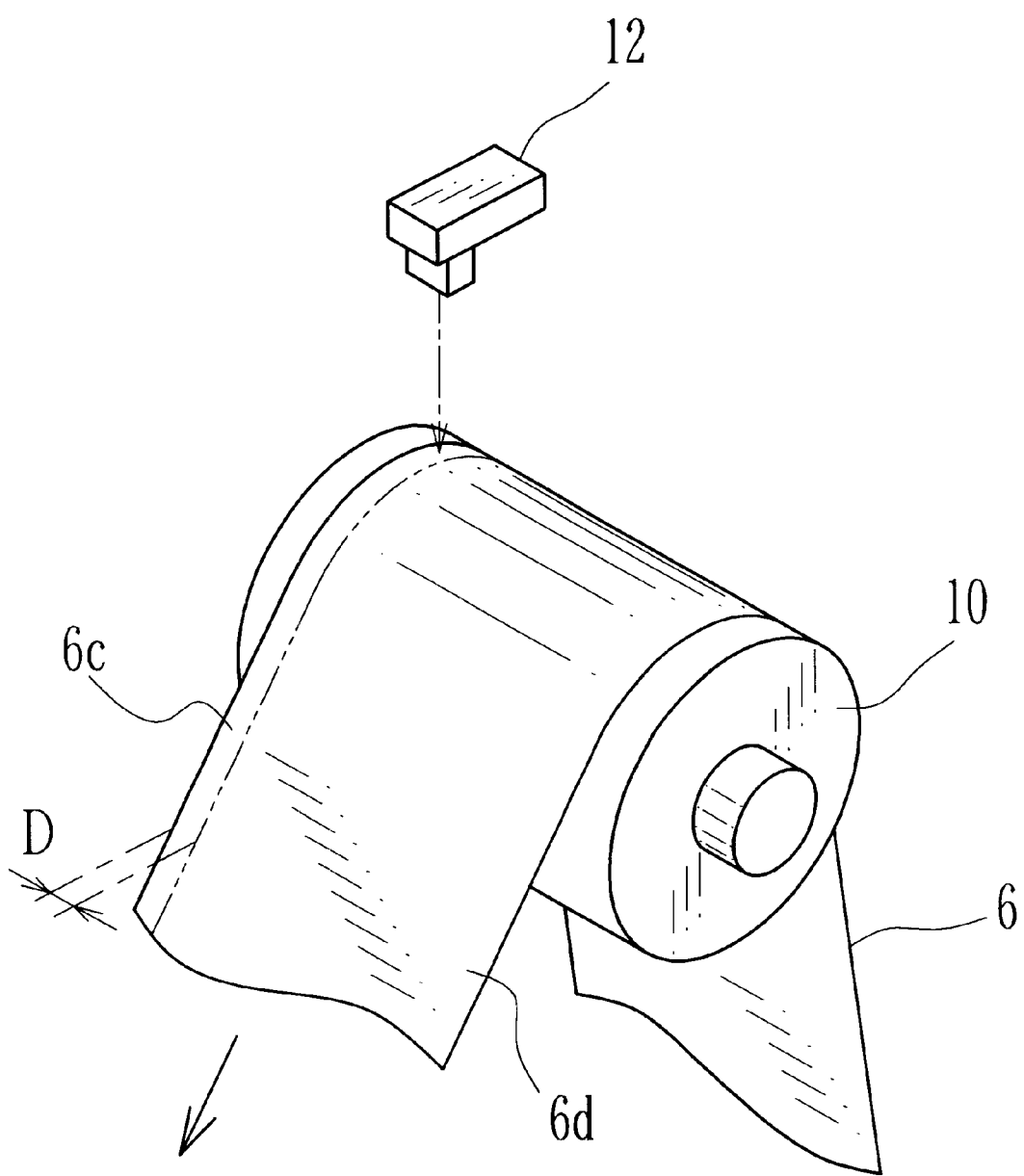
FIG. 2 is a perspective illustrating a side printing process.

The Brownie film is produced in production processes and apparatus disclosed in Japanese Patent Laid Open No. 10-213884, for example. During manufacturing the filmstrip 6, a side printing is performed. As shown in FIG. 2, in the side printing process, patterns in characters, marks and the like are optically recorded in the first lateral side portion 6c of the filmstrip 6 by driving a printing head 12 while feeding the filmstrip 6 in a direction of an arrow by a printing roller 10 rotating in a constant speed. To avoid damaging the emulsion surface, the filmstrip 6 is fed with the emulsion surface facing upward. Moreover, for the printing roller 10, a suction roller or the like is used to prevent the filmstrip 6 from slipping on the printing roller 10.

The printing head 12 comprises a light emitting portion in which plurality of minute light emitting diodes (LEDs) are arrayed in a direction perpendicular to the advancing direction of the filmstrip 6, that is a lateral direction of the filmstrip 6, and an imaging lens through which light from the light emitting portion forms images on the emulsion surface of the filmstrip 6. The predetermined printing patterns are pre-exposed by driving the printing head 12 in synchronicity with the feeding of the filmstrip 6 and by lighting the LEDs selectively. When colored printing pattern is recorded in the side printing process, plural kinds of LEDs array that light in different colors are provided. In addition, it is possible to form images of colored dot on the filmstrip 6 through the lens by making the colored dot in such a manner that lights of three different LEDs enter through each of incident ends of three optical fibers and projected from the optical fibers through unitized emission ends. This type of a printing head is disclosed, for example, in Japanese Patent Laid Open No. 8-22080.

The side printing process is performed only to the first lateral side portion 6c of the filmstrip 6. The first lateral side portion 6c is set a width D from the first lateral side within 2 mm. It is preferable that the width D is not over 2.5 mm. Moreover, in view of facilitating discernment of characters and patterns, it is preferably more than 1.5 mm.

FIG. 3 illustrates the filmstrip 6 in which the first lateral side portion 6c is on the upper side, viewed from the base surface side thereof, after processing. When unexposed, the left in FIG. 3 is the film leader side corresponding to the side of the leader 7a, and the right therein is the film trailer side corresponding to the side of the film trailer 7b. The side printing is performed only in the first lateral side portion 6c. The side printing patterns include a manufacturer name 15a, a kind of the film 15b, an arrow 15c, a frame number 15d, and an emulsion number 15e. Moreover, in the first lateral side portion 6c, the side printing patterns may further include a production date, a product lot number and a total production number in forms of characters and bar codes.

A pitch L of the frame number 15d is determined to fall in the 39 mm to 43 mm range. If the filmstrip 6 is cut into each picture frame, at approximately 45 mm interval, of the smallest size format 6 cm×4.5 cm, at least one frame number 15d can exist in each cut piece. To enable to correspond to further small frames, for example, the HI-vision frames in which their longer side are taken along lateral direction of the filmstrip 6 and their shorter sides are taken along the longitudinal direction, the pitch L may be between 28 mm and 32 mm.

Moreover, because positions of the photographed frame 4 and the frame number 15d do not correspond to each other, the frame number 15d is used as positional information indicating the position in the longitudinal direction of the filmstrip 6. Therefore, it is possible to use alphabets and the like instead of the frame number 15d. Note that the arrow 15c is subsidiary of "ISO 897" and it points toward the film leader. Moreover, it is disadvantageous in spacing that all side printing patterns are recorded on one side of the filmstrip 6. However, it is helpful to use small characters f or product management data such as production numbers and an emulsion number, and to use large characters for data used by processing laboratories and users such as product names or frame numbers.

According to the above, the side printing patterns are recorded only in the first lateral side portion 6c, whereas the second lateral side portion is remained blank. It is possible to record freely arbitrary individual printing patterns through a data imprinting device of the camera on the second lateral side portion 6d. Moreover, the side printing patterns are the erect right images, viewed from the base surface side while the first lateral side portion 6c is the upper side of the filmstrip. Therefore, the side printing patterns can be observed in the erect right images when photographed images visualized in the processing are observed in erect right images. Similarly, the individual printing patterns through the data imprinting device of the camera are also preferably recorded in postures observable as the erect right images.

Figure 4:
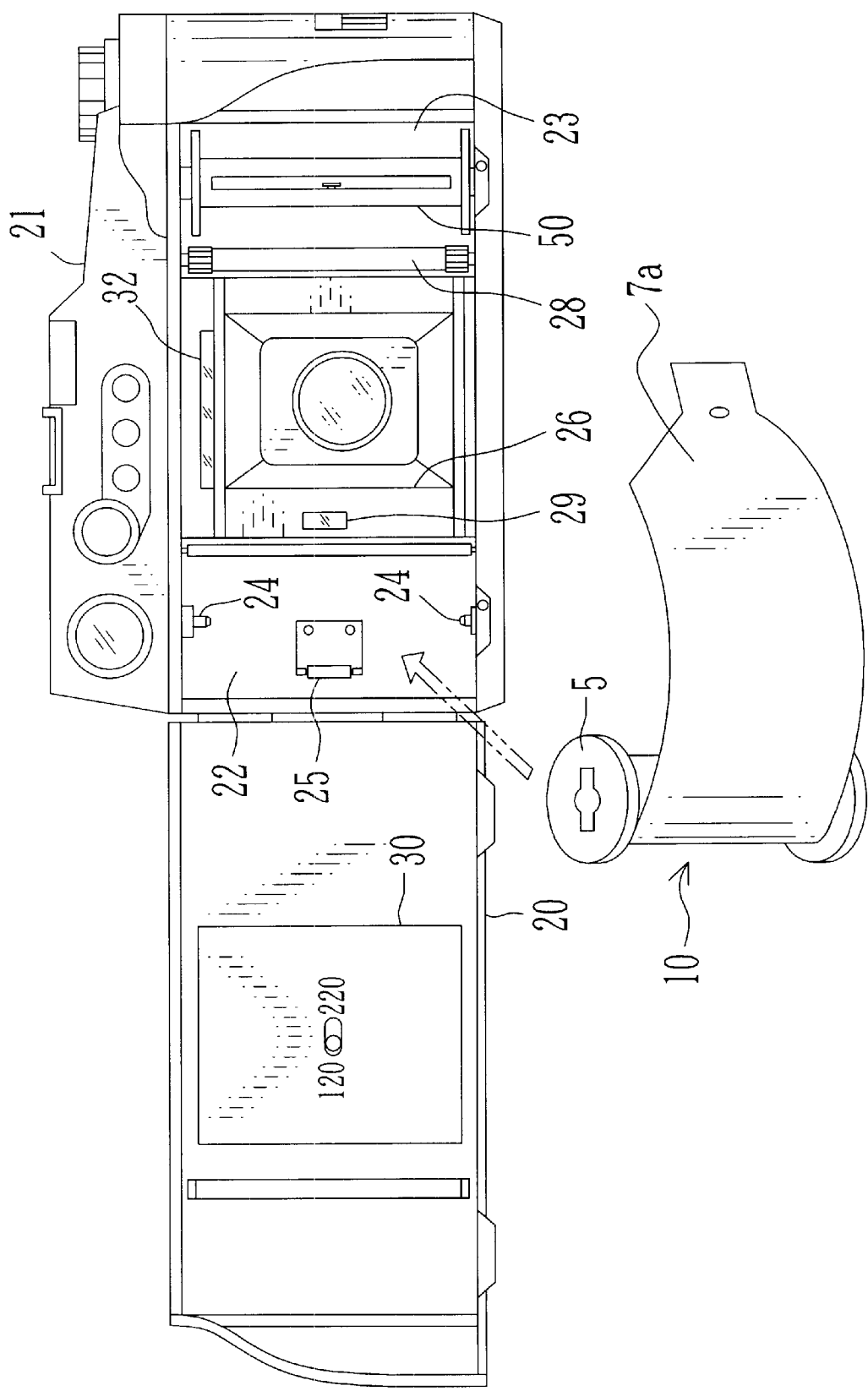
FIG. 4 is a rear side view of a Brownie camera with its rear lid is open.

FIG. 4 shows a semi-sized camera of which frame size is of 6 cm×4.5 cm for the above Brownie film. On a rear side of a body 21, a film supply chamber 22 and a film take-up chamber 23 are provided. On top and bottom walls of the film supply chamber 22, shafts 24 are mounted movably in a direction of their axis. The shafts 24 are urged by a spring (not shown) to enter a circled portion formed respectively in the keyholes 5c of the spool 5. The shafts 24 rotatably support the spool 5 about which the Brownie film is wound.

In the film take-up chamber 23, a take-up spool 50 is rotatably set. The take-up spool 50 is the spool 5 from which the Brownie film used in last photography is taken away. To the keyholes 5c of the take-up spool 50, winding shafts (not shown) are inserted. The winding shafts rotate the take-up spool 50 in a film winding direction by a drive of a feeding motor when winding the film. In addition, an urging roller 25 supported by a leaf spring pushes lightly the Brownie film that is loaded in the film supply chamber 22 to prevent looseness of the Brownie film roll and to give sufficient tension when winding up the film.

Between film supply and film take-up chambers 22 and 23, is provided an exposure aperture 26 corresponding to the frame size of 6 cm×4.5 cm to define exposure region on the filmstrip. Between the exposure aperture 26 and the film take-up chamber 23, a measuring roller 28 that is rotated by the Brownie film is provided to perform one frame feeding control and film counter advancement. Between the exposure aperture 26 and the film supply chamber 22, a bar code reader constituted of a reflective photo sensor is disposed to read the bar code printed on the adhesive tape 8 to enter the film information into a control circuit of the camera when the film is fed right after being loaded into the camera.

A film pressure plate 30 is mounted to the rear lid 20. The film pressure plate 30 is positioned behind the exposure aperture 26 when the rear lid 20 is closed. The film pressure plate 30 and film rails that are provided on top and bottom of the exposure aperture 26 form a tunnel therebetween, and then the Brownie film passes through the tunnel. For loading the 220 type Brownie film, the film pressure plate 30 is slid leftward. Thereby, the film pressure plate 30 is moved as much as the thickness of the backing paper to shorten the height of the tunnel.

When the Brownie film roll 10 is loaded into the camera, the rear lid 20 is opened fully. In a state where the filmstrip 6 is opposed to the exposure aperture 26, the Brownie film roll 10 is set into the film supply chamber 22. Next, the seal tape 9a is peeled, and then the leader 7a is pulled a little to be inserted to a slit of the take-up spool 50. In this state, the first lateral side portion 6c is positioned on the bottom of the exposure aperture 26.

A data imprinting device for recording the individual printing pattern comprises a data processing section and a data exposure head 32 in a well-knowing manner. The data exposure head 32 is disposed on the top of the exposure aperture 26 contactable to the filmstrip 6. The data exposure head 32 is constituted of many minute LEDs arranged in a form of dot matrix to record preferred character and mark patterns in the second lateral side portion 6d.

When the rear lid 20 is closed, a motor automatically rotates to wind the Brownie film around the periphery of the take-up spool 50 such that the leader 7a forms inner turns of the roll. After the take-up spool 50 winds predetermined length of the Brownie film, the motor stops. At this time, the first picture frame is located behind the exposure aperture 26.

When a shutter button is pressed down, the shutter starts operating to expose the first picture frame. After the exposure, the data exposure head 32 displays the individual printing patterns representing the photographic conditions of the first picture frame. The displayed individual printing pattern is recorded on the Brownie film through a contact printing. The photographic conditions comprise a focal length of a taking lens, an f-stop, a shutter speed, information on whether it is over or under exposure, and information on whether it is a flash photography or not. The data exposure head 32 records the above information in forms of the inverted mirror images corresponding to the photographic images exposed on the emulsion surface in inverted mirror images. After accomplishing the photography of the first picture frame, the motor starts rotating. The exposed portion of the filmstrip 6 is wound about the take-up spool 50 by the rotation of the take-up spool 50. Thereby, the second picture frame is set behind the exposure aperture 26.

When all of the picture frames in the filmstrip 6 are photographed, the trailer 7b is wound around the outermost turn of the take-up spool 50. The trailer 7b prevents the photographed filmstrip 6 from ambient light. After the rear lid 20 is opened, the exposed Brownie film wound about the take-up spool 50 is taken from the film take-up chamber 23. After taken out, a free end of the releasable label 9b is fixed to a part of the trailer 7b not to loosen the roll of the exposed Brownie film.

Figure 5:
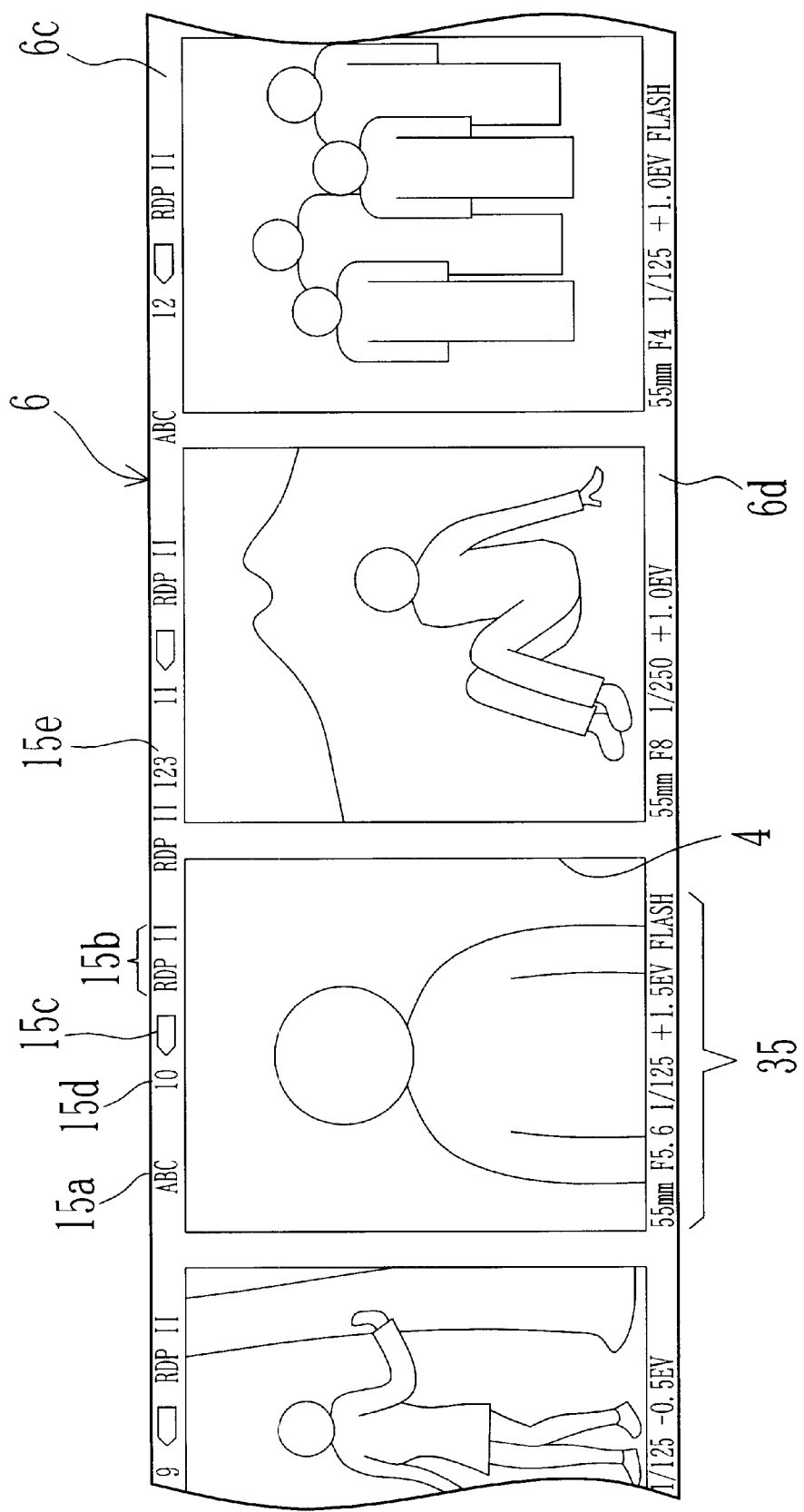
FIG. 5 is a plan view of a developed filmstrip in which an individual printing pattern is recorded.

FIG. 5 shows the filmstrip 6 that is developed. It illustrates a state where top and bottom of the filmstrip 6 is inverted from those at the photography, viewed from the base surface side to make the photographed images in erect right images. Along the first lateral side portion 6c that is positioned upside of the filmstrip, the side printing pattern is recorded. Along the second lateral side portion 6d that is lower side of the filmstrip, the individual printing patterns 35 are recorded through the data exposure head 32.

The advancing direction of the film is from the right to the left or along the longitudinal direction, depending upon a camera type. Therefore, recording posture of the side printing patterns and the individual printing patterns 35 do not necessarily coincide with postures of photographed images. However, it is preferable to record the individual printing patterns 35 in erected postures on the filmstrip 6 like the side printing patterns, viewed from the base surface side.

Especially, in the camera shown in FIG. 4, the individual printing patterns 35 through the data exposure head 32 are recorded in erect right images underneath the photographed images observed in erect right images, so it is useful for storing each cut picture frame in order. Moreover, each of the cut picture frames always has the individual printing patterns on the bottom to ensure appropriate exploitation. The order of the photography can be checked with reference to the frame number 15d.

The data imprinting by the data exposure head 32 is always performed in a constant position with respect to the exposure aperture 26, so the data is imprinted on each photographic frame 4. Therefore, it is preferable to record a frame number at photography by using the data imprinting device. Note that the second lateral side portion 6c is preferably approximate 3 mm from the lateral side to keep the large frame size.

Figure 6:
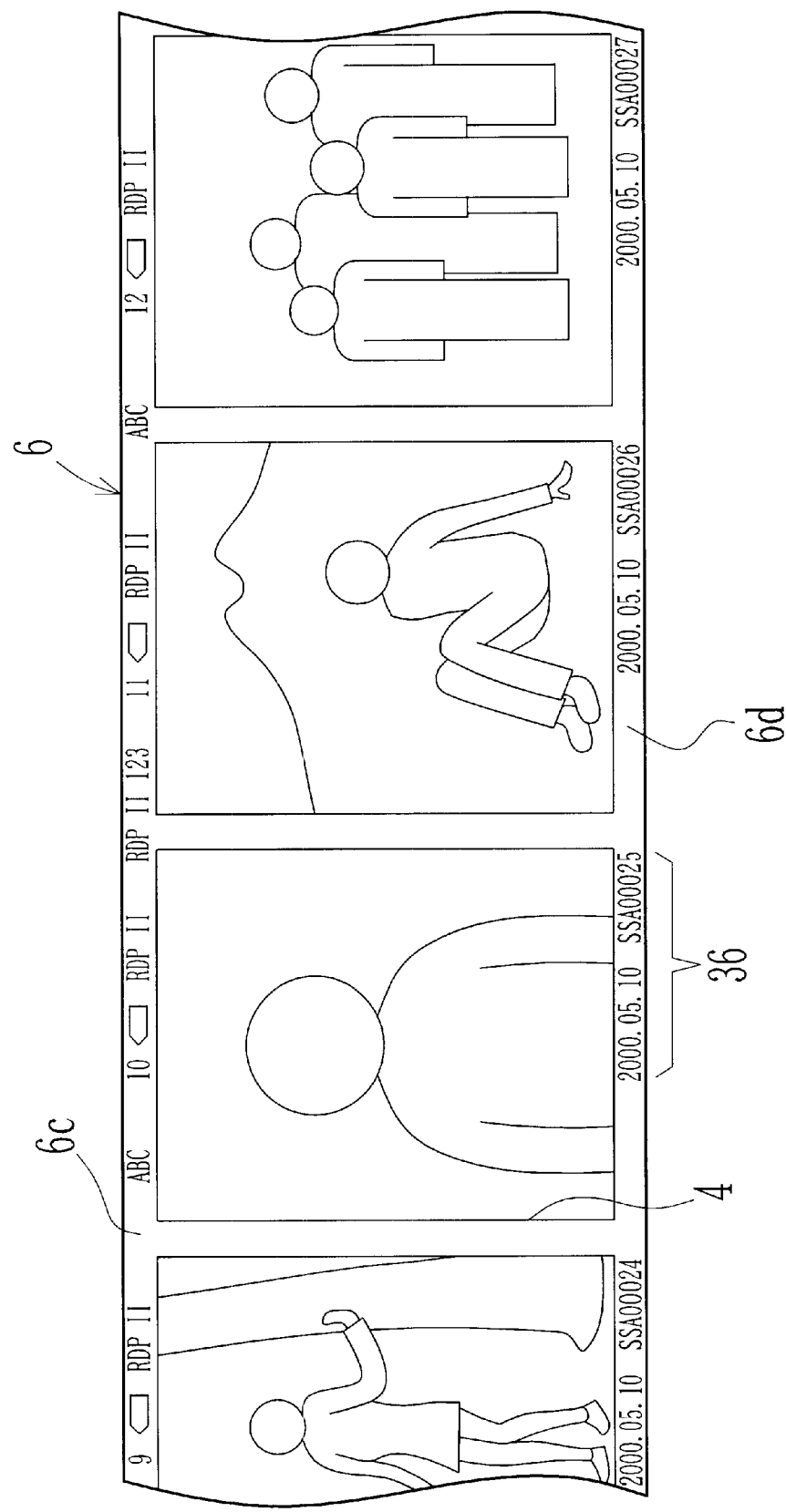
FIG. 6 is a plan view of a developed filmstrip whose individual printing pattern is different from that of FIG. 5.
Figure 7:
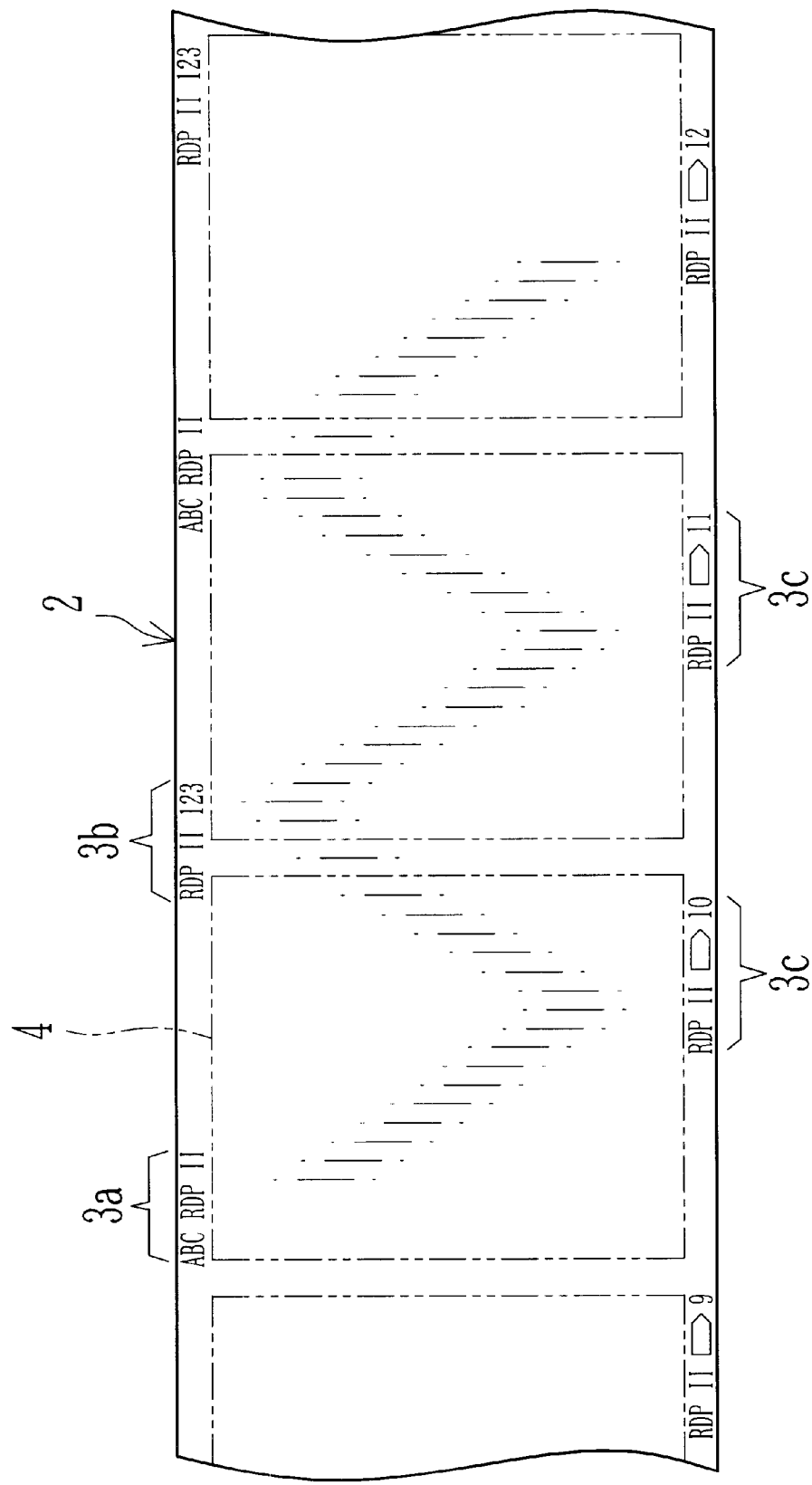
FIG. 7 is a plan illustrating a conventional Brownie film.

FIG. 6 shows another example of individual printing patterns imprinted in the filmstrip. In the first lateral side portion 6c where to be upper side of the film, the side printing patterns are recorded. The individual printing patterns 36 that are recorded in the second lateral side portion 6d where to be lower side of the film represents a photographic date and total frame number. The total frame number is incremented by one at photography in the camera even after the film is changed, and indicates total shot number of the camera. Of course, it is possible to use the total frame number as an ID number for the camera. Note that the leading three digits of the total frame number is a code of the camera.

The total frame number can be used variously not only by camera users but also in processing laboratories. For example, if a processing laboratory keeps photographic images as digital data with their total frame number, the laboratory can immediately find the photographed images of which a user designates the number. The specific code for a camera may be any indications of the camera type or a camera ID code.

The individual printing patterns may include an ID code of a user, a user name, a simple message, and various data and codes that are used in the laboratory, other than the patterns. When data is set by a user arbitrarily, it is necessary to provide a data entering device in the camera. Moreover, a user may select one of printing patterns that are combinations of different information. Furthermore, colors of the printing patterns may be changed according to types of information. Bar codes, combinations of bar codes and characters, and codes and patterns representing compressed data may also be used. If the camera has a data communication device, it is possible to record data that has been entered in computers through the device by the data exposure head 32.

The present invention is applicable to the 220 type Brownie film similarly. When characters and numerals are only data to be recorded, it is possible to use the LEDs arrayed in a segment and a combination of a light source and a LCD panel. The individual printing pattern can be imprinted by projecting printing patterns on the filmstrip through an imaging lens that is disposed between the data exposure head 32 and the filmstrip 6 other than imprinting by contact printing.

Moreover, other than imprinting the individual printing patterns while the filmstrip stops, it may be imprinted while the filmstrip is fed. Accordingly, the LED array may be one line, so the constitution of the exposure head is simplified. A rotary encoder is connected to the measuring roller 28 to output one pulse per given advanced amount of the filmstrip 6. The LED array is controlled to light in synchronicity with the pulse.

Thus, the present invention is not limited to the above embodiments that have been described with reference to the drawings. However, various changes and modifications will be apparent to those having skill in this field. Therefore, unless otherwise these changes and modifications depart from the scope of the present invention that are attached hereto, they should be construed as included therein.

What is claimed is:

1. A Brownie film, wherein a filmstrip is wound about a spool, said filmstrip having first and second lateral side portions outside of photography frames, said Brownie film comprising:

a recorded printing patters printed only in said first lateral side portion, said printing patterns representing information regarding a film and printed upon manufacturing said film;

wherein individual printing patterns are imprinted in said second lateral portion upon photography;

wherein said recorded printing patterns, said individual printing patterns, and said photography frames are in erect right images, viewed from a base surface side of said perpendicular filmstrip when said first lateral side is upper side.

2. A Brownie film as defined in claim 1, wherein said first lateral side portion is upper side, viewed from a base surface side of said filmstrip when said filmstrip is pulled perpendicularly out leftward from said spool.

3. A Brownie film as defined in claim 2, wherein said information regarding to the film includes positional information recorded at a constant pitch.

4. A Brownie film as defined in claim 3, wherein said information regarding the film further includes photosensitivity and type of said film.

5. A Brownie film as defined in claim 4, wherein said first lateral side portion is within 2.5 mm from said first lateral side.

6. A Brownie film as defined in claim 5, wherein a pitch of said positional information is not less than 25 mm and not more than 45 mm.

7. A camera and loadable Brownie film,
wherein said Brownie film is a filmstrip, having first and second lateral side portions, which is wound about a spool,
wherein only said first lateral side portion has recorded printing patterns upon manufacturing of the film,
wherein individual printing patterns are imprinted in said second lateral portion upon photography; and
wherein said camera comprises:
an exposure aperture for exposing said filmstrip to form a picture frame; and
a data imprinting head for imprinting said individual printing patterns representing information regarding said picture frame;
wherein said first and second lateral side portions are outside of said picture frame;
wherein said recorded printing patterns, said individual printing patterns, and said picture frame are in erect right images, viewed from a base surface side of perpendicular filmstrip when said first lateral side portion is upside.

8. A camera and loadable Brownie film as defined in claim 7,
wherein said first lateral side portion is positioned underneath said exposure aperture, said second lateral side portion is positioned above said exposure aperture; and said data imprinting head is disposed above said exposure aperture.

9. A camera and loadable Brownie film as defined in claim 8, wherein said first lateral side portion is upside, viewed from the base surface side of perpendicular filmstrip, when said filmstrip is pulled out leftward from said spool.

10. A camera and loadable Brownie film as defined in claim 9, wherein said individual printing patterns include code and total frame number that are specific for each camera.

* * * * *